(12) United States Patent
Koerner (10) Patent No.: US 8,843,884 B1
(45) Date of Patent: Sep. 23, 2014

(54) INTERACTIVE GRAPHICAL CONSTRUCTION OF PARAMETRIC COMPONENTS OF TYPICAL CROSS SECTION FRAMEWORKS

(76) Inventor: Jason Adam Koerner, Port Orchard, WA (US)

( * ) Notice: Subject to any disclaimer, the term of this patent is extended or adjusted under 35 U.S.C. 154(b) by 866 days.

(21) Appl. No.: 12/951,730

(22) Filed: Nov. 22, 2010

Related U.S. Application Data

(60) Provisional application No. 61/263,748, filed on Nov. 23, 2009.

(51) Int. Cl.
*G06F 9/44* (2006.01)

(52) U.S. Cl.
CPC .............. *G06F 8/34* (2013.01); *G06F 2217/02* (2013.01)
USPC .......................................................... 717/109

(58) Field of Classification Search
CPC ................................ G06F 8/34; G06F 2217/02
USPC .......................................................... 717/109
See application file for complete search history.

(56) References Cited

U.S. PATENT DOCUMENTS

| | | | | |
|---|---|---|---|---|
| 6,056,556 | A * | 5/2000 | Braun et al. .................. | 434/323 |
| 6,243,851 | B1 * | 6/2001 | Hwang et al. ................. | 716/121 |
| 6,292,925 | B1 * | 9/2001 | Dellinger et al. ............. | 716/113 |
| 6,457,164 | B1 * | 9/2002 | Hwang et al. ................. | 716/121 |
| 7,006,956 | B1 * | 2/2006 | Gerlovin et al. .................. | 703/6 |
| 7,079,990 | B2 * | 7/2006 | Haller et al. ...................... | 703/2 |
| 7,173,622 | B1 * | 2/2007 | McLaughlin ................ | 345/473 |
| 7,324,102 | B2 * | 1/2008 | Inzinga et al. ............... | 345/419 |
| 7,599,820 | B2 * | 10/2009 | Inzinga et al. .................... | 703/1 |
| 7,688,318 | B2 * | 3/2010 | O'Malley et al. ............ | 345/420 |
| 8,305,376 | B2 * | 11/2012 | Ran et al. ..................... | 345/420 |
| 2002/0107673 | A1 * | 8/2002 | Haller et al. ..................... | 703/1 |
| 2004/0044988 | A1 * | 3/2004 | Schene ........................ | 717/106 |
| 2004/0145614 | A1 * | 7/2004 | Takagaki et al. ............. | 345/964 |
| 2005/0071135 | A1 * | 3/2005 | Vredenburgh et al. ........... | 703/1 |

OTHER PUBLICATIONS

Design and Implementation of an Object-Oriented Geometric Constraint Solver—Jianjun Oung—University of Florida—2001.*

* cited by examiner

*Primary Examiner* — Lewis A Bullock, Jr.
*Assistant Examiner* — Francisco Aponte
(74) *Attorney, Agent, or Firm* — Lance M. Pritikin (57) ABSTRACT

An interactive graphical method, embodied as computer software, for construction of computer programs known as Subassemblies, which are used to construct components of cross sectional frameworks used to construct 3D models of complex infrastructure configurations, which does not require computer programming experience, skill, knowledge, or activity on the part of the user. In one embodiment, as shown in FIGS. 1-7, computer software consisting of an interactive graphical user interface which facilitates construction of Subassemblies without programming by the user, and a runtime component consisting of: at least one dynamically constructed compiled program library file, referenced program library files, and other non-object code files used in operation.

17 Claims, 7 Drawing Sheets

INTERACTIVE GRAPHICAL CONSTRUCTION OF PARAMETRIC COMPONENTS OF TYPICAL CROSS SECTION FRAMEWORKS

CROSS-REFERENCE TO RELATED APPLICATIONS

This application claims the benefit of PPA No. 61/263,748 filed 2009 Nov. 23.

FEDERALLY SPONSORED RESEARCH

N/A

BACKGROUND

Prior Art

Patents for the prior art are tabulated below:

| Document Number | Publication Date | Name of Patentee or Applicant of Cited Document | Pages, Columns, Lines, Where Relevant Passages or Relevant Figures Appear |
|---|---|---|---|
| U.S. Pat. No. 7,324,102 | 29 Jan. 2008 | Izinga, et al. | |
| U.S. Pat. No. 7,599,820 | 6 Oct. 2009 | Izinga, et al. | |

Additional Prior Art:

| Source | Owner | Product Name |
|---|---|---|
| section3d.com | E. J. Solutions | Section3D © |

Current Computer Aided Design (CAD) software uses parametric components to construct typical cross section frameworks which are used to construct models of complex three dimensional infrastructure configurations such as divided highways, roadway intersections, drainage channels, utility vaults, etc. These parametric components, or Subassemblies, are implemented as either compiled computer program libraries, or as computer macro program libraries, that are invoked by a host CAD software application, hereafter referred to as the Host Application, in which the typical cross section frameworks and complex three dimensional infrastructure configurations are modeled. The complex three dimensional infrastructure configuration models include features which facilitate analysis by which material volumes, statistics, etc. may be determined and tallied, and from which reports may be generated.

Prior art by Izinga, et al, uses either pre-compiled computer program libraries or computer macro program libraries to implement Subassemblies. This limits the average user of the Host Application to those Subassemblies which are included out of the box with that software, or are subsequently made available as pre-compiled libraries; if the user requires functionality in a Subassembly that is not otherwise available, and the user does not possess sufficient computer programming skills to create a Subassembly program on their own, the user must either attempt to use a Subassembly which is insufficient for the purpose or a combination of Subassemblies to model their intended design. If this is not possible, they must hire a software developer to create a custom Subassembly for them, usually at significant expense. If a modification to a custom developed Subassembly becomes necessary, the user must either return to the original developer, or if they possess the source code for the custom Subassembly program, contract another developer to implement the modifications. In either case, additional expense, both direct and indirect via lost productivity, is incurred by the user.

Conventional development of custom Subassembly Programs can be time consuming, especially if changes are made to the Subassembly Program specifications after development has begun or has been completed. Users who retain the services of a developer or computer programmer must wait for the work to be performed, which often takes at least several days once begun. During this time, production may be stalled or slowed while the user waits for the subassembly to be completed. Upon completion of the work, the user must then evaluate the completed Subassembly program for correctness of function and conformance with the specification. Very often at this stage a user will realize that the specification should be changed to fine-tune the behavior of the Subassembly program. If any such changes become necessary, the developer must then return to the subassembly code, implement the changes, and then wait for the user to re-evaluate the Subassembly program in its new form. This process can be reiterated as many times as are necessary to define a correctly functioning Subassembly program.

Existing Subassemblies react to geometric conditions, within the cross section frameworks and three dimensional complex computer models in which they are used, and user provided values for pre-defined subassembly parameters, in order to determine the exact geometry components to add to the model. Existing subassemblies do not include intrinsic analysis features, but rather provide features which may be analyzed by other software components within the host application.

Current practice for creating a custom Subassembly Program involves writing computer program code in one of several languages, usually one of the following: VBA, VB.NET, or C#. Once a program is written, it must be debugged by hosting it within the CAD application for which it was developed. The developer must also create, typically using a manual process, several additional files including images representing the subassembly programs, documentation describing the behavior of the subassembly programs, and a file (or collection of related files) known as Tool Catalog (ATC) File that is used by the Host Application to facilitate access to these files and to the Subassembly Program itself once deployed to a user's computer. All files required to define and use a custom Subassembly Program are typically packaged in an archive file for ease of distribution and deployment.

Current practice for creation of the ATC file is to manually create the file using text editing software. The ATC file consists of data organized according to a pre-defined schema using Extensible Markup Language (XML) format. XML data is notoriously difficult to edit using a text editor because it is extremely sensitive to typing errors such as invalid characters or incorrectly cased letters. Some developers will use specialized XML editing software for creating and editing ATC files, however, the process of creating a usable ATC file, while improved over a plain text editor, is still a tedious manual process. Construction of the ATC file by any manual method is therefore a tedious, time consuming and error prone process.

Prior Art by E. J. Solutions, known as Section3D (copyrighted product name), uses an interactive graphical method to create complete parametric cross section models for use in the same Host Application in which Subassemblies are used, however, Section3D does not dynamically create new computer program libraries nor does it create discrete parametric cross section components. The data generated by Section3D is not usable in the same manner as the Subassemblies provided with the Host Application.

In conclusion, insofar as I am aware, no prior existing product or method provides a method by which a parametric Subassembly or Catalog of parametric Subassemblies may be constructed using an interactive graphical method, without requiring any computer programming on the part of the user, where the output is at least in part an actual computer program library in the form of object or source code which is dynamically created from the input data provided by the user, nor does any existing product or method include intrinsic analysis features in Subassembly Programs. The existing method for construction of a custom parametric Subassembly is to contract the services of a competent computer programmer, which is both expensive and time consuming. Furthermore, modification of conventionally developed Subassemblies requires the services of a computer programmer, usually at additional expense.

SUMMARY

An improved method is to provide an interactive graphical user interface where a user with no programming experience, skills, knowledge, or abilities may construct custom parametric Subassemblies without conventional programming.

Thus, several advantages of one or more aspects are:
- To provide an interactive graphical process and/or mechanism by which compiled program libraries containing one or more parametric Subassembly Programs may be constructed without requiring the user to possess any computer programming experience, knowledge, skills, or abilities, and without requiring the user to retain the services of a competent software developer or computer programmer.
- To provide a process and/or mechanism for constructing Subassembly Programs which contain all information and computer program instructions necessary to effect the intended behavior of the Subassembly Program within the produced computer program library file and/ or associated files
- To allow the user to construct Subassembly Programs in significantly less time than is currently required for the conventional software development process
- To provide a mechanism by which a Subassembly may analyze itself and produce valuable feedback to the user via practical mechanisms suitable to the type of analysis performed, if any
- To produce or copy any and all files associated with and typically distributed with a custom Subassembly, Catalog of custom Subassemblies, or any combination thereof and to package and save these files in a suitable file archive format.
- To automate construction of those files distributed with custom Subassemblies for which the manual creation process is both time consuming and prone to error.
- To produce Subassembly Programs which are primarily used as components of a cross section framework within the Host Application, but may also be used to generate the geometry of an entire cross section framework in a single Subassembly Program
- To produce Subassembly Programs that are used in the same manner as, and, if the user of the Host Application desires, in conjunction with other conventionally developed Subassemblies
- To produce Subassembly Programs and program libraries that are virtually indistinguishable from conventionally developed Subassemblies from within the Host Application.

GLOSSARY OF TERMS

Subassembly: Parametric components used to construct typical cross section frameworks which are used to construct models of complex three dimensional infrastructure configurations such as divided highways, roadway intersections, drainage channels, utility vaults, etc. This term is used generically to refer to the Subassembly, in any form, or a Subassembly in all forms collectively.

Collection: A grouping of similar and/or dissimilar objects or items. Collections may contain zero or more objects or items.

Subassembly Program: Reference to the entire collection of actual program or script instructions which is used to define and control the logic, geometry, and all other programmatic aspects of a Subassembly. It may be in the form of a digital object in memory, a script (in text or other form), source code, object code, or any other appropriate form for the context.

Definition of a Subassembly, or Subassembly Definition: The sum of all components of a Subassembly, including Geometric and non-geometric Components. This construct may exist prior to or after exporting a Subassembly or Subassembly Catalog. In the latter case (postexport), this refers to the user-defined internal logic and geometry written into the exported object code, etc.

Subassembly Data Objects: The digital embodiment of an instance of a Subassembly Definition, either in-memory or stored to a file.

Geometric Components/Geometry Components: Generically refers to data objects which are used to represent a particular parametric geometric or logical configuration. Logical operations and configurations are closely tied to geometry and are therefore included in this definition. Geometric Components may be purely geometric (coordinate geometry), purely logical, or some combination thereof.

Subassembly Parameters: Non-geometric data objects which are used to convey dimensional and other information to a Geometric Component of a subassembly, the values of which may be modified by a human operator both during the editing process and when a Subassembly is invoked in the Host Application. Subassembly Parameters have three basic classifications or categories:
  Input: Accepts input from the user of the Host Application as an instance of the subassembly is being created, or as the subassembly is edited,
  Output: Used by the Host Application to extract certain geometric data from a Subassembly for use as input to another,
  Target: Used by the Subassembly to interact with objects existing in the data model in the Host Application in which the subassembly is being executed (e.g. an object representing a 3D surface may be used as a 'Target' of a slope component in a Subassembly).

Subassembly Variables: Virtually the same as Subassembly Parameters, except that these are internal to the Subassembly and are only shown to a human operator at the time the Subassembly is being constructed or edited; Internal Variables are never shown to the operator of the Host Application.

Catalog or Subassembly Catalog: A collection of Subassembly Data Objects, Subassembly Definitions, or Subassembly Programs. Subassembly Catalog Project File: A copy of a Subassembly Catalog containing Subassembly Definitions or Subassembly Data Objects that is saved to and retrieved from a digital storage device.

Point: A geometric element representing a location in a Cartesian coordinate system.

Link: A line segment existing between two known points.

Shape: A polygon defined as a collection of links which typically form a closed boundary, but may tolerate gaps by assuming a closure between adjacent link endpoints.

Memory: Any volatile or non-volatile means of storing digital data in a computer system.

Display: A visual device to which text, geometric shapes, etc. are rendered and shown to a human operator.

Graphical representation: The visual embodiment of a data object shown to a human operator via a display.

Memory controller: a combination of physical (hardware based) and programmatic (software based) constructs which manage storage of data in memory in a computer Object code: computer program code, compiled to machine language, in the form of an executable file, library file, or assembly.

Dynamically generated object code: Object code created or generated dynamically by another computer program as the program is running.

Pre-compiled object code: Object code which was compiled prior to executing a program.

Reference: Object code may make use of functionality and constructs defined in other object code libraries or assemblies by 'referencing' that other object code library or assembly and invoking the methods and constructs contained therein. Object code may also 'reference' resource, settings, or other files.

Execution of a Subassembly: The operational embodiment of a Subassembly is program code in the form of either an object code or a script library, or some combination thereof, plus additional referenced object code or other files, which may be collectively loaded into memory and the methods of the program code or scripted references to program code contained therein may be invoked and thereby caused to execute. The results of executing a subassembly are the construction of logical and geometric data which may be represented in a graphical form and visually shown to a human operator on a display, and may also be used for calculations and other purposes

DETAILED DESCRIPTION

First Embodiment

One embodiment is comprised of two main components or aspects, implemented primarily in the C# programming language, but also with some components implemented using Visual Basic .NET (VB.NET) and/or Microsoft Intermediate Language (MSIL): a Subassembly construction and editing software application which provides a Graphical User Interface (GUI), a mechanism for creating, constructing, and editing Subassemblies, and a mechanism for generating and exporting Subassembly programs or Subassembly Catalogs; and a Runtime Component which consists of at least one exported Subassembly program library, zero or more common program libraries referenced by the exported subassembly program libraries, and all files associated with or used by the exported Subassembly Program library or libraries.

Each component includes or references all necessary memory controllers, some of which are provided by the operating system and common program libraries, and others may be provided as proprietary computer program code created specifically for a particular programmatic and/or data construct or constructs.

Figure 7:
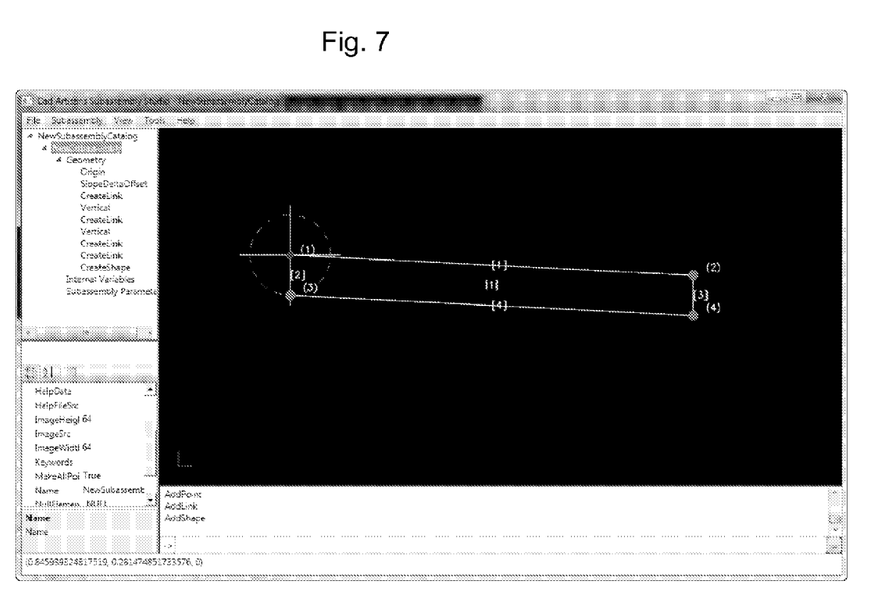
FIG. 7 is a screen image illustrating an embodiment of a graphical user interface with a sample Subassembly Data Object displayed.

The first aspect of the embodiment comprises a software application which provides the mechanisms necessary for creating, constructing, editing (i.e. modifying) and otherwise defining a collection of one or more custom Subassembly Data Objects. This collection is referred to as a "Subassembly Catalog", or simply a "Catalog". The embodiment loads into memory and executes, at which point a GUI is loaded and initialized (FIG. 7 shows one embodiment of this GUI). In this embodiment, an attempt is made during the program initialization phase of operation, which occurs as the software is first loaded into memory, to load the Subassembly Catalog Project File worked on in a previous session. If no previous Subassembly Catalog project file is available or found, a new Subassembly Catalog data object is created in memory.

Once the application has fully initialized, the GUI enters a state where it is able to receive direct input from a human operator, also referred to as a "user", via common computer user interface devices (such as a mouse and keyboard) whereby the user may set the exposed properties of the current Subassembly Catalog, if desired, using the provided GUI, manage the Subassemblies in the current Subassembly Catalog by deleting, copying, or editing existing Subassemblies, or by creating new Subassemblies, which may then be constructed or defined by adding, removing, and editing components.

Figure 1:
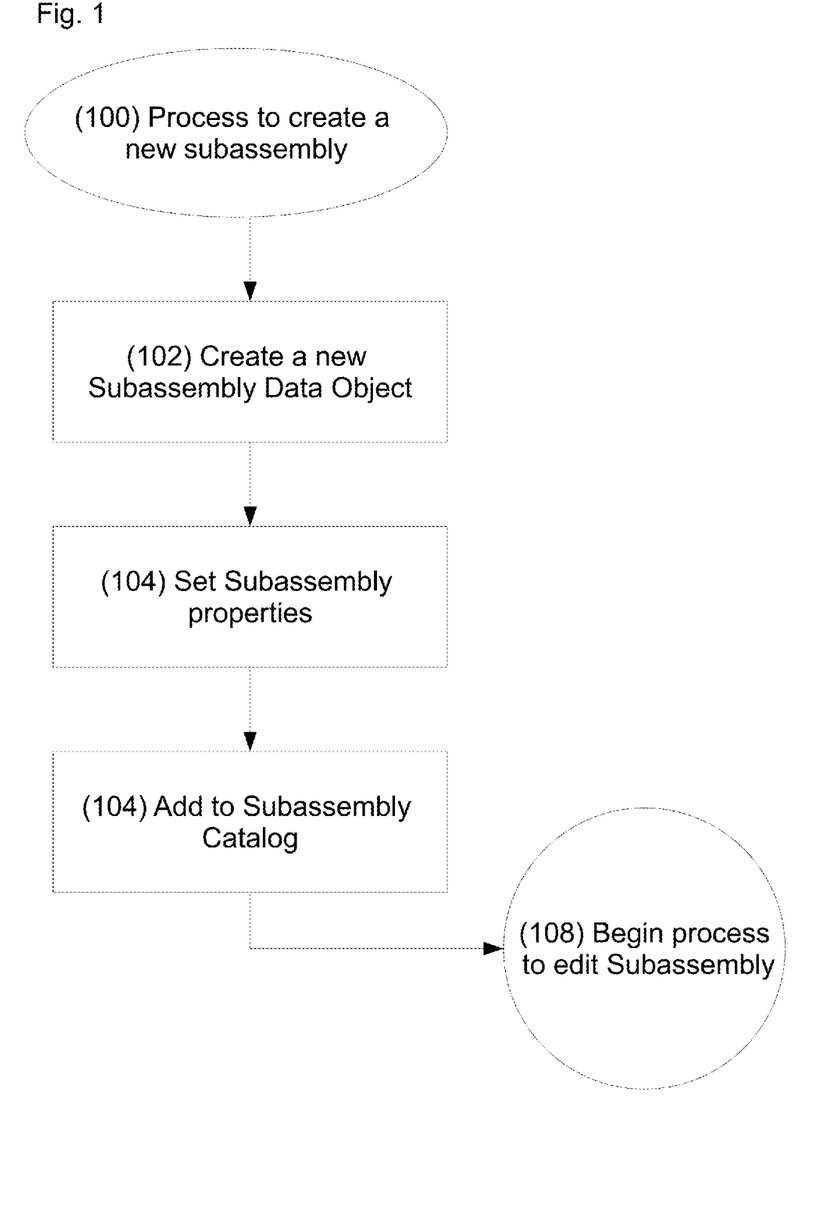
FIG. 1 illustrates one embodiment of the method to create a new Subassembly Data Object and add that object to a catalog of subassembly data objects.

The process followed by the algorithm implemented in the embodiment for creating a new Subassembly (100) is illustrated by FIG. 1. The embodiment includes a mechanism which: creates a new Subassembly Data Object (102) in memory, which includes an automatically created single Geometry Component (see below) which represents the origin point of the Subassembly Data Object; offers the user the opportunity to set one or more properties of the new Subassembly Data Object (104); and subsequently adds the new Subassembly Data Object to the Subassembly Catalog currently loaded in memory by the application. Once the Subassembly Data Object has been added to the Subassembly Catalog, the Subassembly Data Object may be subsequently edited by the process referenced by (108) and defined in FIG. 2.

Subassembly Data Objects consist of several components: Properties, Internal Variables, Subassembly Parameters, collectively referred to as non-geometry components, and Geometric Components, which may include any combination of geometric and logical elements or aspects. Properties are values and attributes which are used to define various aspects of the Subassembly Data Object. Subassembly Parameters and Internal variables are similar components of a Subassembly which may be referenced by other Subassembly components. Subassembly Parameters are exposed to users of the Host Application whereas Internal Variables are not exposed to the user of the Host Application. Geometric Components are discrete coordinate geometry (COGO) and/or logical operation components which are used to construct geometric information in the cross section frameworks in which the exported version of the Subassembly Data Object, or Subassembly Program, is used within the Host Application. Geometric Components are stored as a single collection within the Subassembly Data Object. In the embodiment, Geometric Components are implemented as discrete programmatic entities or classes which are ultimately derived from a common base entity or class. The collection which is used to store the Geometric Components is configured to accept any entity which is derived from this common base entity or class.

Figure 2:
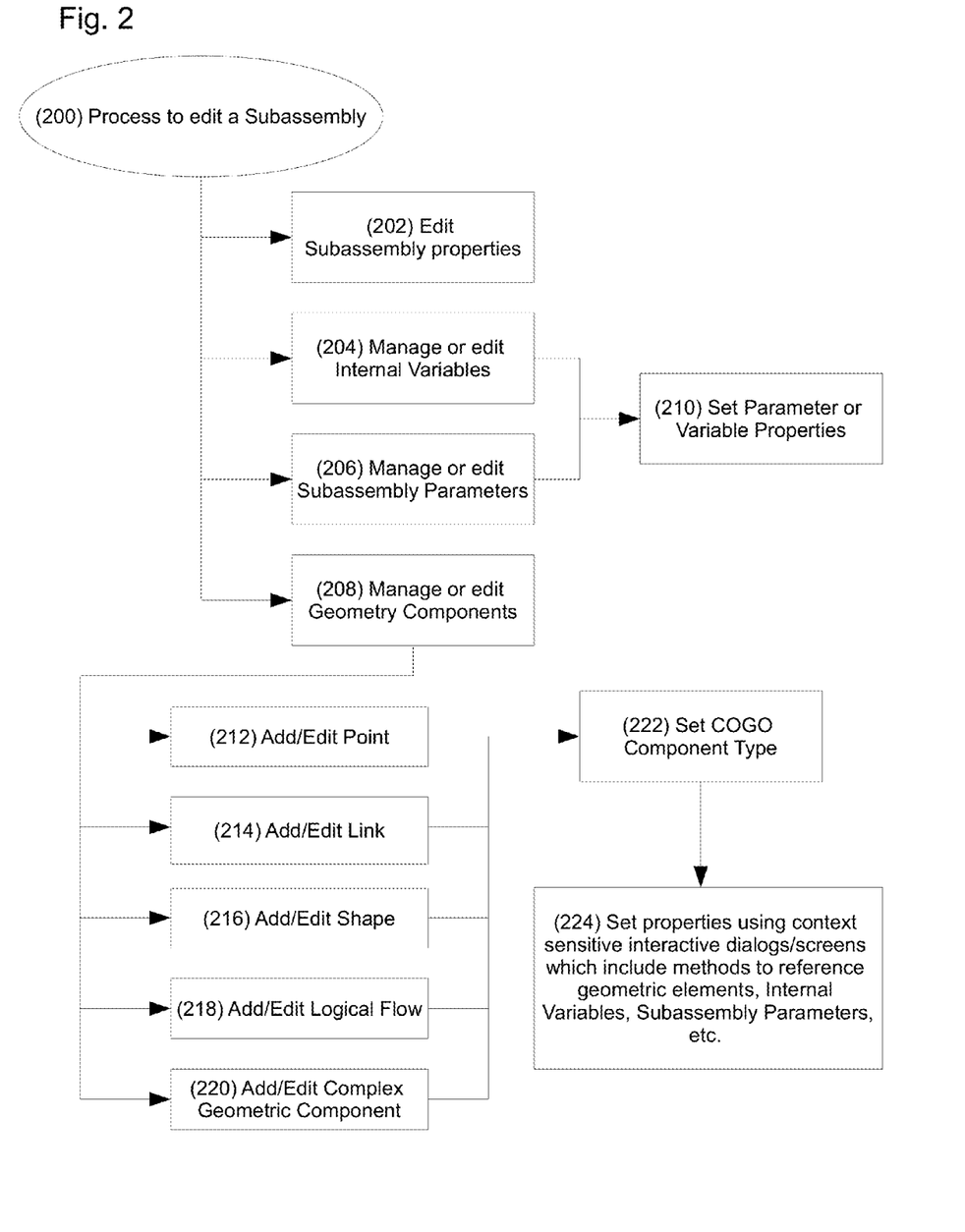
FIG. 2 illustrates one embodiment of a method to edit and define the components of a Subassembly Data Object, including geometric and non-geometric components.

FIG. 2 illustrates the process which enables the user to edit a Subassembly Data Object via the GUI. This process may be invoked directly by the user via the command system in the GUI or indirectly from another process (FIG. 1, (108)). The processes referred to by (202) through (208) may be invoked in any order. In (202), a mechanism is provided which enables the user to modify properties of the Subassembly Data Object. In (204) and (206), a mechanism is provided by which the user may manage or edit Internal Variables and Subassembly Parameters, defined within the context of the current Subassembly data object (add, modify or delete), via a suitable interactive GUI dialog screen referred to by (210). (208) provides a mechanism of managing and editing the Subassembly Geometry Components via Items 212 through 220.

In (212) through (220), shown in FIG. 2, mechanisms are provided by which the user may add a new Geometry Component object to the Geometry Component collection of the current Subassembly Data Object and then edit the new Geometry Component object ((222) through (224) in FIG. 2); the same mechanisms enable the user to edit an existing Geometry Component in the Subassembly data object ((222) through (224)). To facilitate the process of editing a Geometry Component, a mechanism is provided via the GUI which enables the user to set several properties of the component being edited such as geometric information and a reference to one or several geometric elements that already exist in the Subassembly Data Object (referenced elements are created by other Geometry Components). These references allow the edited Geometry Component to be located within the Subassembly, and in the absence of such a reference the Geometry Component is assumed to exist relative to the origin of the Subassembly at the local coordinates (0, 0). The referenced elements are also used to determine whether the edited Geometry Component should actually construct its geometry elements via an 'existing' flag or property of the referenced element. If an element is flagged as 'existing', any Geometry Component which references it will be fully evaluated; if an element is not flagged as 'existing', any Geometry Components that reference it will be evaluated only so far as necessary to generate place-holder elements for the geometric elements that would have otherwise been generated, and each will be flagged as not 'existing'. Any geometric element flagged as 'non-existing' will be moved to the local geometric origin of the Geometry Component which generated it, as determined via the reference point of that Geometry Component. This results in the geometry elements still being created in the model, which preserves the order of the elements within the element collections in memory regardless of which elements are flagged as 'existing', but in such a way that the elements flagged as 'non-existing' appear to have been omitted. The processes referred to in (212) through (220) may be invoked in any order and in any number of repeated instances as desired by the user and dictated by the particular Subassembly design being constructed by the user, therefore the mechanisms described by these Items must have access to the Subassembly Data Object in order to determine which geometric elements and other components have already been defined by the user in the current Subassembly; the information found in the Subassembly data object is used to determine what geometric elements are available for reference for the Geometry Component being edited or created, among other uses. These Items are largely identical with one another, differing primarily in the categorization of Geometry Component being created or edited, and therefore in the actual Geometric Components presented to the user. Geometry Components may be categorized as either one of several basic Types (Point, Link, Shape, or Logical Flow), or as a complex type which combines some or all of the features of the basic Type Categories into a single Geometry Component. The processes referred to in (212) through (220) may be embodied as either separate commands within the UI of the embodiment, combined into commands which allow the user to work with more than one category of Geometry Component within a single command, or some combination thereof; the choice of precisely how to configure this set of commands is largely arbitrary and does not significantly affect the function of the embodiment, provided all categories are accounted for and are grouped in a logical manner. An example of grouping Geometry Component categories for the purpose of forming an "Add/Edit" command that would operate on a complex category (i.e. combined categories) would be to combine the Point and Complex Component categories into a single category.

In (222), shown in FIG. 2, the user is presented via the GUI with a means to select the actual Geometry Component Type to add or edit. The Geometry Component Type is a categorization of the Geometry Component based on the nature of the geometric elements created and/or the logical operations performed by the Geometry Component (e.g. a Geometry Component of Type "Delta Elevation Delta Offset" would locate a point at a horizontal and vertical distance relative to another point). A default Type is provided for each category, and the user may change the Type if desired. If the user changes the Type, the GUI reacts to this change and displays the set of properties exposed by the newly selected Type. In (224), shown in FIG. 2, the properties of the selected Geometry Component Type are displayed on an interactive dialog or GUI screen where the user is able to edit or modify the values thereof. The properties shown to the user are dependent on the Geometry Component Type. The GUI used to edit these properties provides methods which invoke other interactive dialogs or GUI screens which allow the user to edit complex property values in a context sensitive, user-friendly, managed environment where the choices shown the user are only those which are appropriate to the edited/modified property. The GUI also provides a mechanism which allows Subassembly Parameters and Internal Variables to be referenced, either directly or with simple equations or mathematical functions applied to the value being referenced. Other sources of usable values may also be referenced, including other geometric elements within the same Subassembly, properties of other geometric elements within the same Subassembly, and various useful properties taken from the 3D infrastructure model in which the Subassembly is being used within the Host Application.

Figure 3:
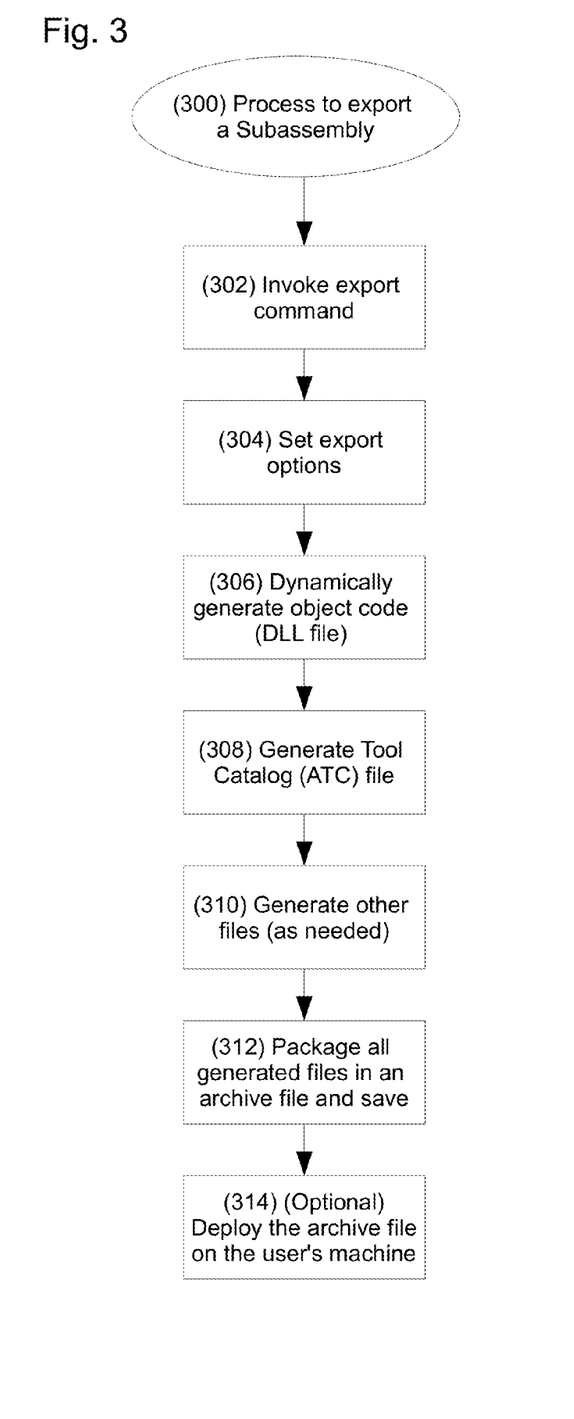
FIG. 3 illustrates one embodiment of the process by which: a Subassembly Data Object or Catalog of Subassembly Data Objects are exported to a compiled program library or libraries; other files associated with the exported compiled program library or libraries are generated or copied from existing files; all files related to the exported Subassembly, Subassemblies, and/or Catalog of Subassemblies are packaged in an archive file; the constructed archive file is optionally deployed on the same computer.

FIG. 3 illustrates the method used by the mechanism for exporting a Subassembly Catalog (300). In (302), the export command method is invoked within the GUI of the embodiment. In (304), the user is shown and is given the opportunity to modify the values of several options which directly or indirectly affect the export process. In (306), the Subassembly Catalog and the Subassemblies defined therein are used to dynamically generate a compiled computer program library (DLL) file, which is also referenced in FIG. 6 by (606), by first dynamically creating and modifying MSIL code, some of which is pre-determined, and then assembling the MSIL code to produce the compiled object code that is stored as a computer program library file. The method used to compile the object code in this embodiment is to programmatically invoke a process in which the generated MSIL source code is converted to object code using a special computer program called ilasm.exe; other methods exist which would also be suitable choices for generating and exporting object code (e.g. using the programmatic methods and features found in the "Reflection.Emit" namespace of the Microsoft .NET Framework). The exported program library file contains a separate class for each Subassembly exported, with each class name based on name of the Subassembly used to create it. The Subassembly Data Object, including the Subassembly Parameters, Internal Variables, and Geometry Components collections are serialized to XML data in the process of exporting the Subassembly Catalog. Part of all of the serialized data may be embedded into the dynamically generated DLL file, or it may be maintained in a separate "script" file. Either option is suitable for proper function of the embodiment. The former option enables the embodiment to perform more efficiently whereas the second allows for in-situ replacement of Subassembly logic. In (308), a Tool Catalog file is generated. The Tool Catalog file is necessary to configure the Host Application so that it may connect to, invoke, and interact with the exported Subassembly Program or Programs. The mechanism by which the Tool Catalog file is generated is to construct a programmatic entity which closely represents the schema of the Tool Catalog file, populate the entity with information extracted from the Subassembly Catalog data object and Subassembly Data Objects contained therein, serialize the entity to XML, and then replace selected portions of the serialized data with reformatted versions of that data so as to fully comply with the Tool Catalog file schema. In Item 310, additional files may be created or copied into memory or otherwise identified for inclusion the archive file created in (312). In (312), the dynamically generated program library file is packaged along with other associated files created or copied in previous steps, and optionally combined with the common computer program library files necessary to run the exported Subassembly Programs (refer to (602) and (604), located in FIG. 6), and the resulting archive file is saved to the local machine (or to a server, portable storage device, or any other viable other storage media). There are several runtime DLL files which are linked to a particular version of the host software with which the exported Subassembly Programs will be used, therefore distinct sets of common runtime files may be provided in order to facilitate compatibility with multiple versions of the Host Application. The actual set of these DLLs used in the archive depends on a selection the user made in (304). In this embodiment, the user is presented with a prompt to deploy the exported archive file on same machine on which the embodiment is currently executing (314). If the user chooses to deploy the file, all files from the exported archive are un-archived to the appropriate location on this machine.

Figure 4:
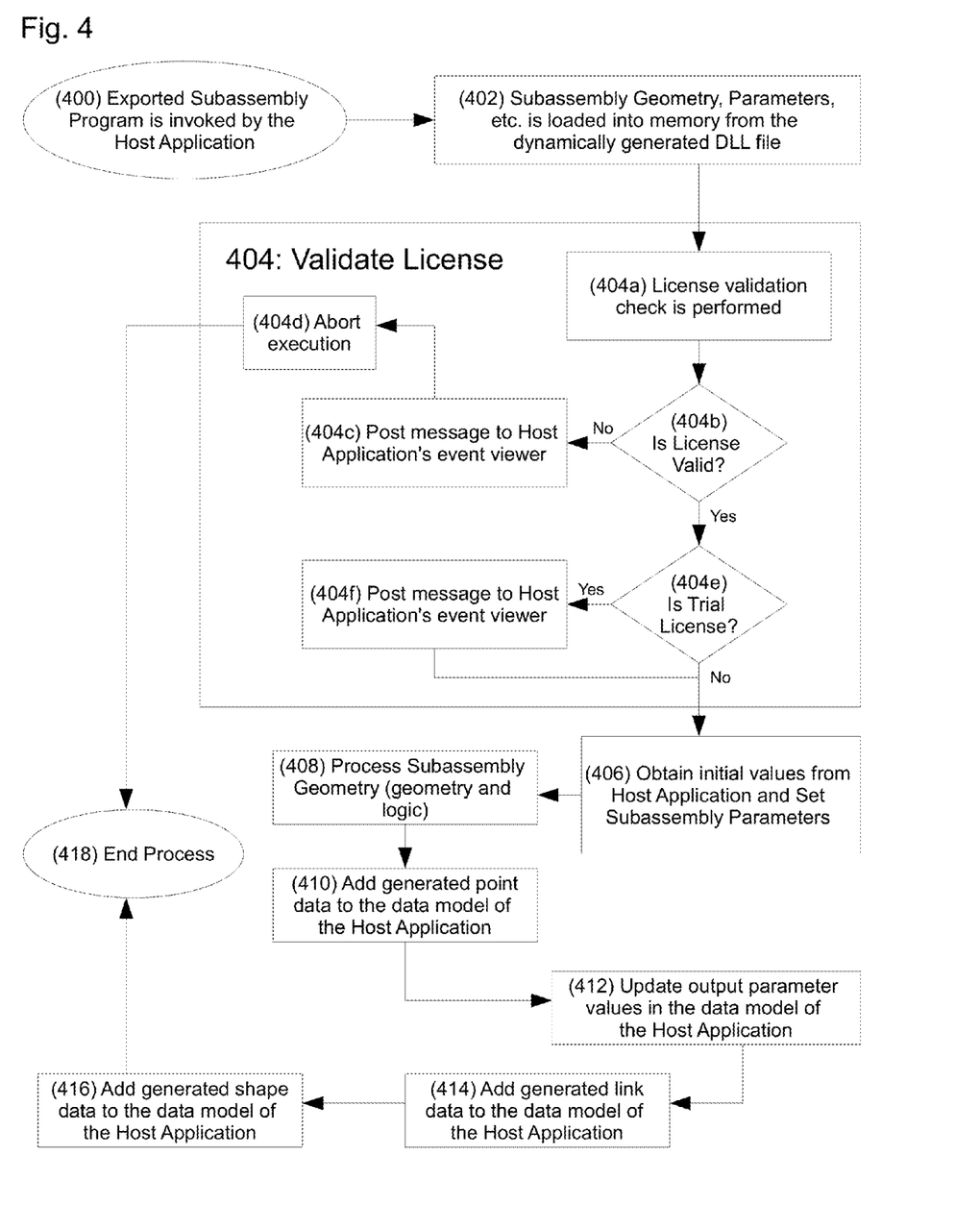
FIG. 4 illustrates one embodiment of an algorithm which will execute when the main method of an exported Subassembly Program, specifically that method which causes the Subassembly Program to construct the geometric components and configurations it is intended to construct, is invoked by the Host Application.

FIG. 4 illustrates an embodiment of part of the Runtime Component, which is the second main aspect of this embodiment. The process of running a Subassembly (400) is initiated when the method of the Subassembly Program which causes the Subassembly Program to create the Geometric Components defined therein as part of a cross section framework within the Host Application is invoked from an instance of the Subassembly class, created in the Host Application. In (402), all components of the Subassembly are loaded into memory from data and/or program code present in the dynamically created program library file created in (306) in FIG. 3 and, if present, from any external script or other data file. The process described in (404) is describes one possible embodiment of a license control system that may be used to authenticate the rights of a user to invoke the exported Subassembly program. It is provided to show how such a licensing mechanism may be incorporated into an embodiment. It is optional in any embodiment and may be easily replaced with another arbitrary licensing process or even no licensing process, at all. It simply serves to provide a mechanism for granting or denying permission to run the Subassembly Program code and, under some conditions, provide feedback to the user containing messages indicating the current status of their license to use the Subassembly Program, as illustrated in (404*a*) through (404*f*). If (404*d*) is reached during execution, execution of the Subassembly Program is aborted. If the license is determined to be valid, or if (404) is omitted, the program proceeds to (406), where the Host Application provides the initial or default values for each of the Parameters defined in and for the Subassembly Program. It should be noted that there are two primary modes in which the Subassembly Program may be executed: layout mode, where the Subassembly is placed in a cross section framework called an assembly; and design mode, where the Subassembly, and optionally other Subassemblies via the assembly which references the Subassembly or Subassemblies, is used to construct an actual three dimensional model of a complex infrastructure configuration. In the latter mode, the Subassembly may interact with other geometric objects within the 3D model loaded into the Host Application whereas in the former mode, such interaction is limited, if it occurs at all. In (408), the Subassembly Geometry (and logic) is processed, and the results are stored in memory. Processing the subassembly logic and geometry involves iterating over the collection of Geometry Components defined in the Subassembly in sequence, causing each Geometry Component to be evaluated, and adding the results (if any) to a set of geometric element collections (points, links, and shapes) stored in memory. In the process of evaluating a Geometry Component, a check may be made against one or more referenced geometric elements of the Subassembly to determine whether the referenced element(s) exist. If the referenced element(s) does not exist, or is flagged as not existing, the Geometry Component may be short-circuited in some situations and produce placeholder elements which are added to the in-memory copy of the Subassembly Data Object, and may also ultimately be added to the data model of the Host Application as placeholders in the data collections in the data model. In (410), all point geometry elements created by the Subassembly and stored in memory are written into the 3D model. In (412), Subassembly Parameters belonging to the 'Output' category of Parameters are updated with values calculated from the stored Subassembly point data, and the results are stored in the data model in the Host Application. Placement of (412) after (410) is somewhat arbitrary—it could just as easily be combined with (410) in such a way that any pending value calculations would occur immediately after the requisite point geometry is created. In either case, the end result would be the same—the data would ultimately be written to the data model. It is shown as a separate step occurring after all point geometry is constructed for clarity. In (414), all valid link element data generated in (408) is added to the data model. A link element is valid provided a) both endpoints actually exist and are flagged as 'existing', and b) the coordinates of the endpoints are not coincident (i.e. the link has a non-zero length). In (416), all valid shape element data generated in (408) is added to the data model. A shape element is valid provided that all link elements used to define the shape exist and are valid. Upon completion of (416), the process is ended in (418) where control is returned to the Host Application after any necessary memory management operations occur.

Figure 5:
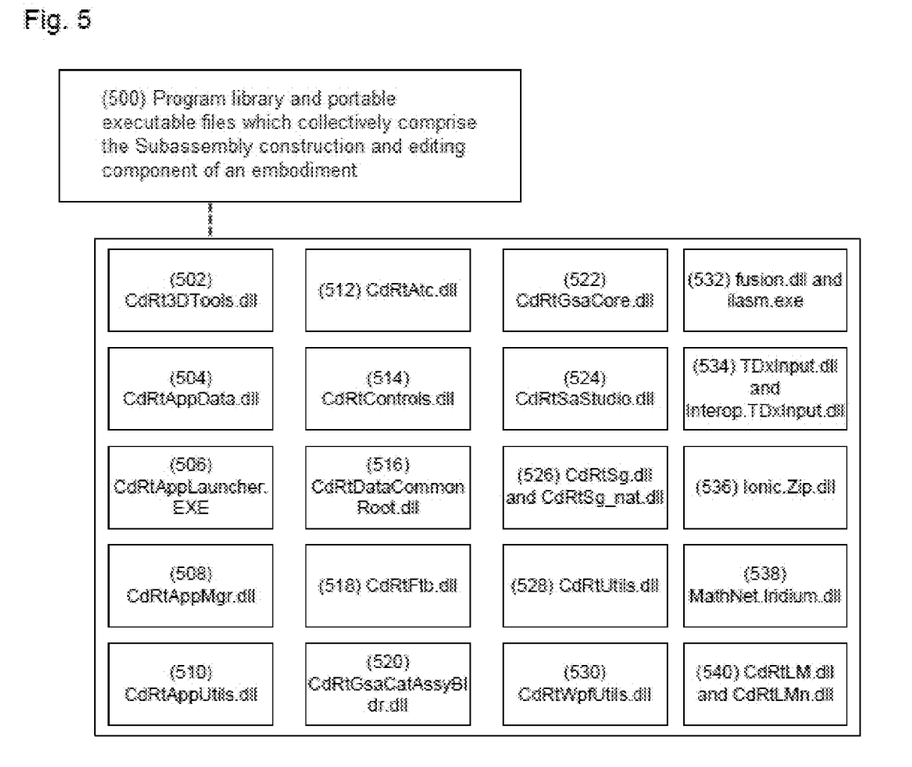
FIG. 5 is an illustration showing all program library and portable executable files which collectively comprise the Subassembly construction and editing component of an embodiment.

FIG. 5 contains a diagram showing all program library files and portable executable files which collectively comprise the construction and editing component of the embodiment, some of which are also utilized by the Runtime Component of the embodiment:

(502) CdRt3DTools.dll is a program library file which primarily contains computer programs and program components which are used for 3D coordinate geometry and graphics.

(504) CdRtAppData.dll is a program library which primarily contains computer programs and program components which are used for data management processes and as base program components from which other program components may be derived.

(506) CdRtAppLauncher.exe is a portable executable file which provides a framework and context in which the object code of the embodiment executes, including a generic GUI, the specific content of which (such as toolbars and toolbar items, menus and menu items, etc) is provided by the main program library of the embodiment (524).

(508) CdRtAppMgr.dll is a program library which primarily contains computer programs and program components which provide mechanisms for locating and loading the main program library of the embodiment (524) into memory, a command system framework for enabling interaction between the user and data and methods of the embodiment via the GUI, and base program components from which other program components may be derived.

(510) CdRtAppUtils.dll is a program library which primarily contains computer programs and program components which are used as common utilities by other program components in the embodiment. A "utility" is a program method, or collection of program methods, which serve some useful purpose, usually within a particular context.

(512) CdRtAtc.dll is a program library which primarily contains computer programs and program components which facilitate the automated production of Tool Catalog (ATC) files, which are necessary for the proper recognition and operation of Subassemblies produced by this embodiment.

(514) CdRtControls.dll is a program library which primarily contains computer programs and program components which define Graphical User Interface (GUI) elements (and related components) used in the embodiment.

(516) CdRtDataCommonRoot.dll is a program library which primarily contains computer programs and program components which are used as base components from which other program components are derived.

(518) CdRtFtb.dll is a program library which primarily contains computer programs and program components which provide the basic framework for constructing a feature table, which is a software mechanism by which data elements are related to graphical display attributes and geometry based on one or more aspects of the data element. These programs and components provide a base from which other program components in the embodiment may be derived.

(520) CdRtCatAssyBldr.dll is a program library which primarily contains computer programs and program components which are used to dynamically construct the dynamic source code which is used to generate the program library file(s) (306, located in FIGS. 3; and 606, located in FIG. 6) based on the user defined Subassembly data objects and Subassembly Catalog.

(522) CdRtGsaCore.dll is a program library which primarily contains computer programs and program components which are used as the common data constructs for Subassemblies, such as Subassembly Parameters and Geometric Components. These program components contain program class definitions, program methods which operate on the data, etc.

(524) CdRtSaStudio.dll is the main program library for the editing component of the embodiment. It contains computer programs and program components which determine the specific content of the GUI framework implemented in (506) and (508), implementation of command methods which may be invoked within this framework, derived data components based on other components of this embodiment, etc.

Figure 6:
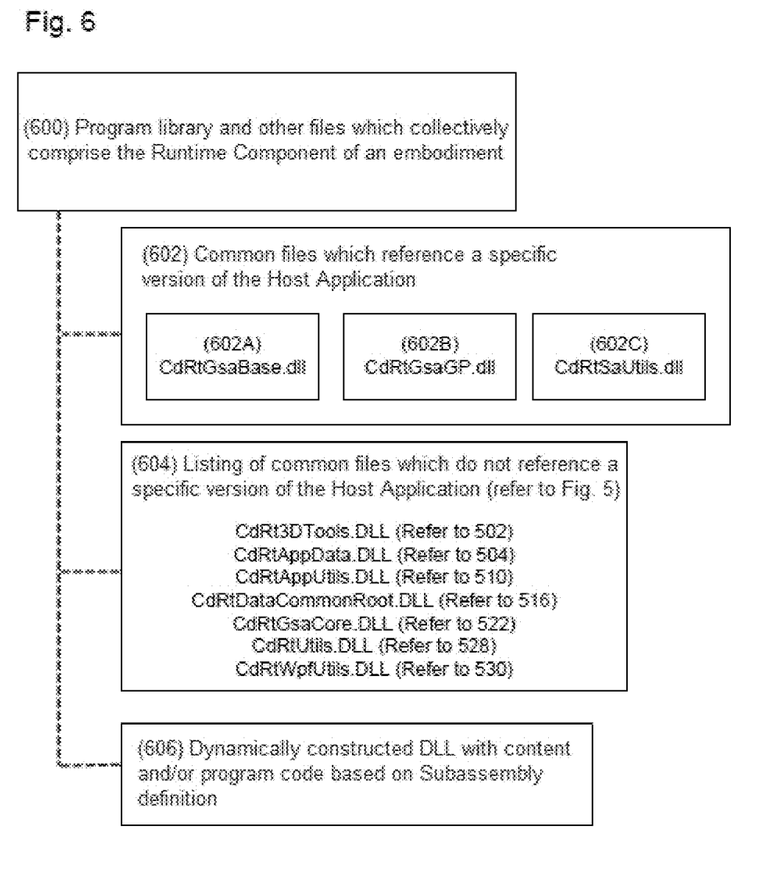
FIG. 6 is an illustration showing all program library files which comprise the Runtime Component of an embodiment

(526) CdRtSg.dll and CdRtSg_nat.dll are a linked pair of obfuscated program library files which are used to generate and encrypt a licensing signature which is embedded into the dynamically created program library files(s) (306, located in FIGS. 3; and 606, located in FIG. 6). The functionality present in these files may be easily recreated or bypassed without compromising the primary functionality of this embodiment, and the nature of the functionality may be easily inferred from the context in which it is referenced and invoked in other program components of the embodiment, with minimal creativity, by any programmer competent in the art. The source code for these files is therefore omitted from the source code listing.

(528) CdRtUtils.dll is a program library which primarily contains computer programs and program components which are used as utility functions and methods invoked by other program components in the embodiment, and as base components from which other program components may be derived.

(530) CdRtWpfUtils.dll is a program library which primarily contains computer programs and program components which are used as GUI elements and components, and as base program components from which other program components may be derived.

(532 through 538) are third party components (program libraries and portable executable files) which are referenced and/or used by the embodiment. These third party components are used under license granted by, and are readily available from, the respective owners. No source code is included for these components.

(540) CdRaM.dll and CdRtLMn.dll are a linked set of obfuscated program library files, which comprise a licensing mechanism referenced in object code form and used by the embodiment. The actual implementation details of the licensing component are not relevant to this embodiment and are therefore omitted from the source code listing.

FIG. 6 contains a diagram showing all program library files which collectively comprise the Runtime Component of the embodiment, the implementation details of which are given in the description of the illustration given in FIG. 4. The program library files shown in FIG. 6 are:

(602) contains the program library files with are linked to a particular version of the Host Application, which will be used to load the exported Subassembly Programs into memory and invoke the respective methods thereof. The embodiment includes several versions or sets of these files in order to facilitate compatibility with multiple versions of the Host Application; one set of Runtime Component files is required per version of the Host Application with which the embodiment is to be compatible.

(602A) CdRtGsaBase.dll is a program library which primarily contains computer programs and program components which are as base components from which the dynamically constructed program components of the dynamically constructed program library file (606) are derived. The base components contained therein enable the embodiment to minimize the amount of code which must be dynamically generated, and enable other aspects of the embodiment to better interact with certain components by providing a common code inheritance structure.

(602B) CdRtGsaGP.dll is a program library which primarily contains methods which are used to generate geometric data from the exported Subassembly Programs in the context of the cross section framework in the data model in the Host Application. It contains methods which facilitate interaction between the various Subassembly components, and with the data model in the Host Application. It also contains program components from which other program components may be derived.

(602C) CdRtSaUtils is a program library which contains program methods which are used by other components of the embodiment, and program components which are used as base program components from which other program components may derive. Other components contained therein enable the Host Application to recognize the program components as Subassemblies.

(604) provides a listing of the common program libraries used by the Runtime Component of the embodiment which do not depend on the specific version of the host software. These program files are also common to the construction and editing component of the embodiment, and descriptions thereof are found in the detailed descriptions of FIG. 5, items (502), (504), (510), (516), (522), (528), and (530).

(606) is the dynamically constructed program library (DLL) file which is based on the Subassembly and Subassembly Catalog data modeled by the user (using the editing component of the embodiment), and exported using the process described in FIG. 3 (and, more specifically, constructed in (306) in FIG. 3). The dynamically constructed program library file may contain dynamically generated program code or other content based on the user defined Subassembly, Subassemblies, or Subassembly Catalog from which the file is created.

Operation

First Embodiment

To operate the first embodiment, the user would invoke the portable executable file containing the main method of the embodiment, using any of several standard methods, provided by the operating system software running on the computer on which the embodiment is installed, for invoking portable executable files, in order to cause it to load into memory and execute. The user would then: use the Subassembly Catalog loaded into memory by default; load an existing Subassembly Catalog from an accessible storage device; or create a new Subassembly Catalog.

The user would then: export the Subassembly Catalog; add a new Subassembly to the Catalog; modify an existing Subassembly; modify the Catalog properties; or invoke any other command provided by the GUI. The components used in the process of creating, constructing, and editing a Subassembly have been previously described in the detailed description of the process illustrated by FIG. 2; the user would invoke those processes in the order the user sees fit. The user has the option to use most commands and perform most actions at any time, including saving the Subassembly Catalog, exporting the Subassembly Catalog, etc. The user is not required to use the commands in any particular order; however, some commands are context sensitive and will only function and/or expose certain features and functionality under certain conditions; for example, the user would not be shown functionality for creating a new Subassembly while in the process of editing a Geometric Component property, nor would they be shown possible choices for the value of the edited property that are not valid to use for that particular property.

The runtime component, which contains the actual constructed Subassembly Programs as compiled object code in one or more program library files, and other files as required, as described in the description of (300) through (314), and as illustrated in FIG. 3, is used in the same manner as any conventionally developed Subassembly. That is, the Subassembly Program is used in the same manner proscribed by the Host Application for conventionally developed Subassembly Programs.

Detailed Description

Other Embodiments

In another embodiment, a feature called a "sandbox" would be included. The sandbox feature enables the user to test the runtime behavior of the Subassembly Data Objects by simulating the design mode environment in which the Subassembly Program is executed via the Runtime Component. It would allow the user to create, remove, and modify any number of target objects which may be mapped to the Subassembly Parameters from the Target Parameters category, at which point the Subassembly would be dynamically executed in simulated design mode with the output geometry placed on the screen in the editor.

In another embodiment, a three dimensional sandbox feature would be implemented, which enables the user to perform the actions described for the first embodiment of a sandbox, as described above, and additionally observe transition behavior between simulated cross section frameworks in a 3D model of a simulated complex infrastructure configuration.

In another embodiment, functionality would be included that would automate the production of documentation files which could be further modified by the user, for each exported Subassembly. These files would be included in the exported archive file for the Subassemblies and Subassembly Catalog.

In another embodiment, the Geometric Components of the Subassemblies would include analysis methods which would be invoked as the Subassembly Program is executed. An example of this is an analysis method which would calculate retaining wall stability as or after the retaining wall geometry is created by the Subassembly Program.

In another embodiment, Geometric Component types would be included that would enable user defined geometry to be repeated or stacked until some user defined condition is met. An example of where this would be useful is in construction of a Subassembly that would model a stacked modular block retaining wall. In this example, a "Concrete Block" Subassembly might be created to serve as the repeated geometry, and then might be repeatedly invoked inside of another Subassembly (the "Retaining Wall") until a user-defined condition is satisfied.

In another embodiment, Geometric Component properties would be able to reference (in addition to the items listed in the first embodiment in the description for (224) of FIG. 2) complex equations which use references to Subassembly Parameters, Internal Variables, and geometric component properties as equation variables. Equations would also be able to make use of pre-defined functions such as trigonometric functions, etc.

In another embodiment, complex equations would be able to make use of user defined functions, which are implemented as other complex equations, in addition to pre-defined functions.

In another embodiment, pre-defined Subassembly Parameters and Internal Variables would be provided for the user to insert into their Subassembly Definitions. This would speed up the process of creating Subassembly Parameters and Internal Variables by providing readily accessible default configurations.

In another embodiment, the editing component of the embodiment (the GUI which provides the user with an interactive graphical method for creating and editing Subassemblies), would be implemented as a program library with public methods designed to run within and be invoked from the same Host Application which is used to create instances of and invoke the exported Subassembly Program and Runtime Component.

Operation

Other Embodiments

In other embodiments, additional features may be accessed by the user during the course of using an embodiment. In these cases, the user may access these features where and when possible, as described in the detailed description for the embodiments.

Operation

Any Embodiment

Each of the various embodiments requires a modern computer system with a compatible operating system, which may vary between embodiments, a monitor, and at a minimum a keyboard and mouse as user input devices. Some embodiments may optionally use additional input devices. Some embodiments may not require that the operating system or computer be compatible with the Host Application used load and execute the Runtime Component of the embodiment.

Each of the various embodiments enables the user to create custom parametric Subassemblies in a fraction of the time required for conventional custom Subassembly development, and without requiring any programming on the part of the user. A user need only be familiar with the general operation and use of Subassemblies in general in order to use an embodiment.

Where common programming terms may be exposed to the user as labels and/or as values within an embodiment, the terms are defined, in the context of the use thereof in the embodiment, in the accompanying documentation, so the user is not required to have any prior knowledge of the definition of the terms in the context of computer programming. An example of this occurs when defining a data type (which is used to determine whether a value is to represent text, an integer or decimal number, etc.) for a Subassembly Parameter, where the user is able to choose from a list containing common programming terms and variants thereof.

One skilled in the art would recognize that the method of construction and modification of Subassemblies implemented in the various embodiments may be used in an iterative manner. That is, after constructing a subassembly, as described for (200) through (224), the user may then export the Subassembly or Subassemblies as described for (300) through (314), deploy the exported Subassembly or Subassemblies, and as illustrated in and described for FIG. 3, use the exported Subassembly Program or Programs in the Host Application, return to the embodiment to make alterations, and export and deploy the Subassembly or Subassemblies again. The user may also switch between Subassemblies and Subassembly Catalogs, making modifications, additions, and removals in any order desired.

CONCLUSION, RAMIFICATIONS, AND SCOPE

In sum, the embodiments provide an interactive graphical method for construction of computer programs used to construct components of cross sectional frameworks, which are used to construct a 3D model of complex infrastructure configurations without custom programming on the part of the user.

Thus, the reader will see that at least one embodiment enables a user, who possesses little or no programming experience, skills, knowledge, or ability, to create an unlimited number of custom parametric Subassemblies in a fraction of the time required using existing, conventional methods. The user is able to use an interactive graphical method for creating, constructing and editing Subassemblies, and may export and deploy the Subassemblies as desired. The exported Subassemblies consist of all dynamically constructed compiled program library and other files based on the user defined Subassemblies, all image and documentation files used in conjunction with the exported subassemblies, and optionally the common runtime program library files referenced or used by the exported Subassembly program library file(s). The user may also determine the version of the Host Application they want to use the exported subassemblies with and optionally include the associated set of compatible common Runtime Components.

While the above description contains many specificities, these should not be construed as limitations on the scope of any embodiment, but as exemplifications of various embodiments thereof. Many other ramifications and variations are possible within the teachings of the various embodiments. For example:

An embodiment may include additional Geometric Components which would offer the user additional variety and options in the geometry and logic which may be used in the Subassembly models constructed by the user.

An embodiment may utilize a GUI element not present in other embodiments, which would facilitate inclusion of a feature or features unique to that embodiment or common to multiple embodiments, or improvement upon a GUI element used for that feature or features in another embodiment.

An embodiment may use an alternate licensing scheme, or no licensing scheme at all An embodiment may use additional, or fewer, properties or components to define any data object.

An embodiment may be implemented using a different computer programming language or combinations of programming languages (for example, instead of C#, VB.NET might be used).

An embodiment may use a different file and/or directory structure for storing the files that comprise any component thereof.

An embodiment may reference or otherwise utilize additional external files.

An embodiment may expose methods and interfaces which enable the exported subassembly program libraries to be referenced and used from other custom computer programs.

An embodiment may include additional commands for modifying and creating subassemblies and subassembly catalogs.

An embodiment may include alternate export and/or deployment mechanisms and/or options.

An embodiment may run on other operating systems or types of computers.

An embodiment may work with alternate versions of the Host Application used for the executing the Runtime Component, or with different host software.

An embodiment may use a different number of, or different, referenced program library files.

An embodiment may locate program components in different program library files, and/or use different implementations of program library files.

An embodiment may include functionality which alters or, causes to be altered, the data model or framework in which the Subassemblies exported by the embodiment are used (for example, a subassembly may cause the Host Application to insert additional cross sections at certain locations on a data model).

An embodiment may utilize a feature table or some other mechanism to allow the user to specify the graphics element(s) and/or graphics attributes (such as color, etc) used to visually represent the various elements of a subassembly data object model based on element type, classification, code or other property value, etc.

Thus the scope should be determined by the appended claims, and ultimately by the claims appended to the actual patent application that will reference this provisional patent application, and their legal equivalents, and not by the examples given.

SEQUENCE LISTING OR PROGRAM

A digital copy of the program source code of an embodiment, exclusively in MSIL (Microsoft [.NET] Intermediate Language), of all critical components of one embodiment is provided in the form of one TXT file for the first main aspect of the embodiment, and two files for the second main aspect of an embodiment (each compatible with a different version of the Host Application). Each of these files contains combined source code for the individual components of that module. Common components are only listed once in the main module in which they are primarily defined and are not repeated in dependent modules. Several components are excluded because the source code and rights are either owned by a third party and used under license (e.g. specialized hardware interface modules provided by the hardware manufacturer), or constitute non-critical components with respect to the implementation and operation of the embodiment (e.g. licensing control modules).

Listing of program files:

SaS.TXT: Main program module (Subassembly Construction and Editing Component)

2009RT.TXT: Dependent module (Runtime Component)

2010RT.TXT: Dependent module (Runtime Component)

The invention claimed is:

1. A method for enabling a human operator to construct a custom parametric subassembly without requiring computer programming on the part of the human operator, the method comprising the steps of:

establishing a definition of the subassembly, the definition including:

a collection of one or more geometric components, and a collection of zero or more subassembly parameters, the subassembly parameters being non-geometric data objects;

storing the subassembly in a memory;

displaying a graphical representation of the subassembly on a display;

providing a graphical user interface through which the definition is modifiable by the human operator, whereby the human operator may selectively:

add geometric components to the definition, modify one or more of the geometric components in the definition, remove one or more of the geometric components from the definition, add subassembly parameters to the definition, modify one or more of the subassembly parameters in the definition, and remove one or more of the subassembly parameters from the definition; and causing a memory controller to:
- direct any added geometric component into the collection of geometric components in the memory,
- direct any modifications of the geometric components into the collection of geometric components in the memory,
- cause any removed geometric component to be removed from the collection of geometric components in the memory,
- direct any added subassembly parameter into the collection of subassembly parameters in the memory,
- direct any modifications of the subassembly parameters into the collection of subassembly parameters in the memory, and
- cause any removed subassembly parameter to be removed from the collection of the subassembly parameters in the memory;

wherein the human operator can, by way of the graphical user interface, cause dynamically generated object code to be created from the definition without requiring the human operator to write computer code in a programming language, wherein the dynamically generated object code references and is functionally dependent on pre-compiled object code.

2. The method of claim 1, further comprising the step of generating a distributable archive file containing the dynamically generated object code.

3. The method of claim 1, further comprising generating a tool catalogue file from the definition of the subassembly.

4. The method of claim 1, further comprising simulating the execution of the subassembly wherein the results of the simulation are shown on the display.

5. The method of claim 1, wherein the human operator can further add a group of several geometric components to the definition of the subassembly.

6. The method of claim 1, further comprising:
- loading the dynamically generated object code into memory; and
- executing the dynamically generated object code.

7. A machine for creating at least one custom parametric subassembly without requiring computer programming on the part of the human operator, the machine comprising:
- a memory;
- a memory controller;
- a display;
- at least one a graphical user interface for enabling a human operator to:
  - establish a definition of the subassembly, the definition including:
    - a collection of one or more geometric components, and
    - a collection of zero or more subassembly parameters, the subassembly parameters being non-geometric data objects;
  - store the subassembly in the memory;
  - view a graphical representation of the subassembly displayed on the display; and
  - modify the definition, wherein the human operator may selectively:
    - add geometric components to the definition,
    - modify one or more of the geometric components in the definition,
    - remove one or more of the geometric components from the definition,
    - add subassembly parameters to the definition,
    - modify one or more of the subassembly parameters in the definition, and
    - remove one or more of the subassembly parameters from the definition; and logic for causing the memory controller to:
- direct any added geometric component into the collection of geometric components in the memory,
- direct any modifications of the geometric components into the collection of geometric components in the memory,
- cause any removed geometric component to be removed from the collection of geometric components in the memory,
- direct any added subassembly parameter into the collection of subassembly parameters in the memory,
- direct any modifications of the subassembly parameters into the collection of subassembly parameters in the memory, and
- cause any removed subassembly parameter to be removed from the collection of the subassembly parameters in the memory;

wherein one of the at least one graphical user interface enables the human operator to cause dynamically generated object code to be created from the definition without the human operator being required to write computer code in a programming language, wherein the dynamically generated object code references and is functionally dependent on pre-compiled object code.

8. The machine of claim 7, wherein one of the at least one graphical user interface is configured to be used by the human operator to generate a redistributable archive file containing the dynamically generated object code.

9. The machine of claim 7, wherein one of the at least one graphical user interface is configured to be used by the human operator to cause a tool catalog file to be generated from the definition of the subassembly.

10. The machine of claim 7, wherein one of the at least one graphical user interface is configured to be used by the human operator to cause the execution of the subassembly to be simulated, and subsequently cause the results thereof to be shown on the display.

11. The machine of claim 7, wherein one of the at least one graphical user interface is configured to be used by the human operator to cause a group of several geometric components to be added to the definition of the subassembly.

12. The machine of claim 7, wherein the machine is configured to:
- cause the dynamically generated object code to be loaded into the memory; and
- cause the dynamically generated object code to be executed.

13. A non-transitory machine readable medium having stored thereon data representing one or more sequences of instructions, which when executed by a computer system, cause the computer system to create a custom parametric subassembly without requiring computer programming on the part of the human operator, by performing the steps of:
- establishing a definition of the subassembly, the definition including:
  - a collection of one or more geometric components, and
  - a collection of zero or more subassembly parameters, the subassembly parameters being non-geometric data objects;
- storing the subassembly in a memory;
- displaying a graphical representation of the subassembly on a display;

providing a graphical user interface through which the definition is modifiable by the human operator, whereby the human operator may selectively:
add geometric components to the definition,
modify one or more of the geometric components in the definition,
remove one or more of the geometric components from the definition,
add subassembly parameters to the definition,
modify one or more of the subassembly parameters in the definition, and
remove one or more of the subassembly parameters from the definition; and
causing a memory controller to:
direct any added geometric component into the collection of geometric components in the memory,
direct any modifications of the geometric components into the collection of geometric components in the memory,
cause any removed geometric component to be removed from the collection of geometric components in the memory,
direct any added subassembly parameter into the collection of subassembly parameters in the memory,
direct any modifications of the subassembly parameters into the collection of subassembly parameters in the memory, and
cause any removed subassembly parameter to be removed from the collection of the subassembly parameters in the memory;

wherein the human operator can, by way of the graphical user interface, cause dynamically generated object code to be created from the definition without requiring the human operator to write computer code in a programming language, wherein the dynamically generated object code references and is functionally dependent on pre-compiled object code.

14. The machine-readable medium of claim 13, wherein execution of the one or more sequences of instructions further causes the computer system to perform the step of generating a distributable archive file containing the dynamically generated object code.

15. The machine-readable medium of claim 13, wherein execution of the one or more sequences of instructions further causes the computer system to perform the step of generating a tool catalogue file from the definition of the subassembly.

16. The machine-readable medium of claim 13, wherein execution of the one or more sequences of instructions further causes the computer system to perform the step of simulating the execution of the subassembly wherein the results of the simulation are shown on the display.

17. The machine-readable medium of claim 13, wherein execution of the one or more sequences of instructions further causes the computer system to perform the steps of:
loading the dynamically generated object code into memory; and
executing the dynamically generated object code.

\* \* \* \* \*